United States Patent [19]
Artieri

[11] Patent Number: 6,081,298
[45] Date of Patent: Jun. 27, 2000

[54] MPEG DECODER WITH REDUCED MEMORY CAPACITY

[75] Inventor: Alain Artieri, Meylan, France

[73] Assignee: SGS-Thomson Microelectronics S.A., Saint Genis, France

[21] Appl. No.: 08/612,283

[22] Filed: Mar. 7, 1996

[30] Foreign Application Priority Data

Mar. 14, 1995 [FR] France ................................. 95 03163

[51] Int. Cl.$^7$ ............................. H04N 7/01; H04N 11/20
[52] U.S. Cl. .......................... 348/446; 348/415; 348/715
[58] Field of Search .................................. 348/402, 405, 348/412, 413, 415, 416, 423, 409, 446, 714, 715, 718; 382/244, 245, 246, 247; H04N 7/01, 11/20

[56] References Cited

U.S. PATENT DOCUMENTS

| | | | |
|---|---|---|---|
| 5,227,878 | 7/1993 | Puri et al. ................................. | 358/136 |
| 5,504,530 | 4/1996 | Obikane et al. ........................ | 348/413 |
| 5,510,840 | 4/1996 | Yonemitsu et al. ..................... | 348/402 |
| 5,574,504 | 11/1996 | Yagasaki et al. ........................ | 348/415 |

FOREIGN PATENT DOCUMENTS

| | | | |
|---|---|---|---|
| 0 576 289 | 12/1993 | European Pat. Off. ....... | H04N 7/137 |
| 0 710 028 | 5/1996 | European Pat. Off. ......... | H04N 7/24 |
| 0 714 208 | 5/1996 | European Pat. Off. ......... | H04N 7/24 |

OTHER PUBLICATIONS

French Search Report from French Patent Application 95 03163, filed Mar. 14, 1995.
Proceedings of ICASSP–92, vol. V, Mar. 23, 1992, San Francisco, pp. V–661–V–664, I. Tamitani, et al. "An Encoder/Decoder Chip Set For the MPEG Video Standard".
European Search Report from European Patent Application 96 41 0022.

*Primary Examiner*—Tommy P. Chin
*Assistant Examiner*—Nhon T. Diep
*Attorney, Agent, or Firm*—Wolf, Greenfield & Sacks, P.C.

[57] ABSTRACT

This MPEG Decoder relates to the decoding of an image that can be of a bi-directional type requiring data from two previously decoded images, each image being displayed in two successive fields corresponding to lines with different parities. Each bi-directional image is decoded twice during its display time, a first time as a first field of the image is being directly displayed, and a second time as the second field is being directly displayed.

6 Claims, 2 Drawing Sheets

MPEG DECODER WITH REDUCED MEMORY CAPACITY

BACKGROUND OF THE INVENTION

1. Field of the Invention

The present invention relates to the decoding of compressed images, in particular according to the MPEG standards. It more specifically relates to the data exchange between an image processing circuit and a dynamic memory.

2. Discussion of the Related Art

According to various image compression standards, in particular the MPEG standards, the images are processed by squares, the size of the squares being generally 16×16 pixels. To each square corresponds a so-called "macroblock". The macroblocks can have different formats. The most commonly used is the format called 4:2:0 according to which each macroblock contains four blocks of 8×8 luminance pixels of 8 bits and 2 blocks of 8×8 chrominance pixels of 8 bits.

The processed images are essentially of three types, that is, the "intra" type, the predicted type and the bi-directional type. The macroblocks of an "intra" image are not submitted to a motion compensation. In a predicted image, each macroblock can be submitted to a motion compensation which consists of combining the macroblock with another macroblock, called a predictor macroblock, fetched in a previously decoded image. Each macroblock of a bi-directional image can be submitted to a motion compensation which consists of combining the macroblock with two other predictor macroblocks respectively fetched in two previously decoded images. The locations of the predictor macroblocks are determined by motion vectors.

As it clearly appears, an MPEG decoder must store at least two previously decoded images to be able to process a bi-directional image. In fact, it also stores the currently decoded image so as to appropriately reorganize the pixels before displaying them. Indeed, the pixels are decoded block by block while they should be displayed line by line (first a field of odd lines, then a field of even lines).

FIG. 1 schematically shows an MPEG decoder discussed in European patent application 0626653. The decoder includes a dynamic memory (DRAM) accessible over a 64 bit bus B64. A pipeline circuit 12 receives compressed data over bus B64 and provides an adder 14 with the luminance and chrominance blocks of the processed macroblocks. Morever, the adder 14 receives corresponding blocks from predictor macroblocks which are supplied to a predictor circuit 16 over bus B64. Pipeline circuit 12 generally performs a variable length decoding (VLD), a run-level decoding (RLD), a conversion of zigzag scanning into linear scanning, and an inverse discrete cosine transform (DCT). According to the MPEG standards, predictor circuit 16 essentially includes a so-called "half-pixel" filter for shifting a predictor macroblock vertically and/or horizontally by half a pixel, if a motion vector for fetching this predictor macroblock is not an integer.

The decoded pixels supplied by adder 14 are stored in a buffer (FIFO) 18 before being transferred into memory 10 over bus B64.

A display circuit 20 receives pixels to displayed from memory 10 via a buffer 22.

The exchanges between memory 10 and the various decoder elements are managed by a memory control unit (MCU) 24.

Memory 10, as previously mentioned, must store two previously decoded images in order to restore a bi-directional image. In addition, a currently restored bi-directional image must also be stored in the memory to send its pixels to display 20 in an appropriate order. Thus, memory 10 includes at least three image areas IM1 to IM3. Each of these areas IM1 to IM3 must be able to store a PAL image (the largest according to the international standards) of 720×576 pixels. In using the 4:2:0 macroblock format, the pixels are of 12 bits and the total image size is 4,976,640 bits.

Additionally, the MPEG standards recommend that memory 10 should comprise a compressed data area CD of at least 2.6 Mbits where the compressed data wait before being processed, and an area X utilized for storing On Screen Display (OSD) information and sound data. The capacity of this area X is approximately 1 Mbit. Hence, the total capacity of memory 10 must be approximately 18 Mbits.

Such a memory is difficult to implement with current commercially available components. Indeed, the most current dynamic memory component, and thus the cheapest, has a capacity of 256 kilowords of 16 bits (256 k×16). With four of these components, a 16 Mbit memory accessible over a 64-bit bus is readily implemented. However, it is not advantageous to add 2 megabits accessible over the same 64-bit bus. An immediate solution would be to add 4 Mbits by connecting a component of 64 kilowords of 16 bits in parallel on each 256 k×16 component. However, 64 k×16 components are not very common and their cost to capacity ratio is particularly high.

SUMMARY OF THE INVENTION

An object of the present invention is to provide an image decoder which can process the images of the different international standards with a reduced memory capacity.

To achieve this and other objects, the present invention provides for displaying each bi-directional image on the run, that is, for displaying the pixels as they are decoded. This saves an image area in the memory, since it is not necessary to store the currently restored image. As a result, the memory capacity falls below the 16 megabits limit readily implementable with the most common memory components.

In order to display a bi-directional image on the run, it is actually necessary to decode it twice during display time. An aspect of the invention is to perform such a double decoding without using fast memory components.

The present invention more specifically provides the decoding of a bi-directional image requiring data from two previously decoded images, each image being displayed in two successive fields corresponding to lines with different parities. Each bi-directional image is decoded twice during the display time of the image, a first time as a first field of the image is directly displayed, and a second time as the second field is directly displayed.

Generally, each image is processed by macroblocks corresponding to image squares, wherein a bi-directional macroblock can be of interlaced type requiring two half predictor macroblocks in each of two previously decoded images. The two half predictor macroblocks of a same previously decoded image then correspond to lines with different parities. According to an embodiment of the invention, to process an interlaced bi-directional macroblock, only the two half predictor macroblocks corresponding to the lines of the displayed field are used in each of the two decoding processes.

According to an embodiment, the present invention detects that the number of processed macroblocks becomes lower than the number of displayed macroblocks and then uses only one of the two predictor macroblocks in the processing of a bi-directional macroblock.

These objects, features and advantages, as well as others, of the present invention will be discussed in detail in the following description of specific embodiments, taken in conjunction with the following drawings, but not limited by them:

DETAILED DESCRIPTION

According to the present invention, instead of storing a currently restored bi-directional image in a memory area for displaying it later, the bi-directional image is displayed on the run, that is, it is displayed as it is being decoded. This allows the cancellation of the memory image area which was required to store the bi-directional image until is display. Therefore, the required size of memory 10 is reduced by the size of an image area, that is, it passes from 18 Mbits to 14 Mbits for the PAL standard (the most constraining). This value is under the 16 Mbit limit which is readily obtained by using four standard memory components of 256 kilowords of 16 bits. Furthermore, the remaining 2 Mbits can be advantageously used to store more On Screen Display information or as a peripheral memory of a microprocessor associated with the decoder.

A problem encountered in displaying on the run a currently decoded image is that a first field constituted by the odd lines of the image is displayed before displaying a second field constituted by the even lines of the image, whereas the processing preceding the display is generally performed on the global image, that is, in the order of its lines. As a result, if the decoder decodes the lines at their display rate, the (2 k–1)th line must be displayed at the time when the decoder decodes the (k–1)th line. In other words, at the time when the first field should have been displayed, the decoder will not have decoded more than half the field.

In order to solve this problem, the present invention provides the decoding of each bi-directional image twice during the display time of the image. In this case, at the time when the (2 k–1)th line must be displayed, 2 k lines will have been decoded. In other words, at the time when the first field will have been displayed, the whole image, and thus the two fields of this image, will have been decoded. As the display is performed on the run, the second field which has been decoded but not displayed is lost. This second field is displayed as the image is decoded a second time.

An important aspect of the invention is to note that decoding a bi-directional image twice as fast is not so constraining as to require twice the rates of data exchange with the memory, and thus to require twice as fast a memory, which would be difficult to find commercially, and which would anyway be much too expensive. Indeed, as shown by the following analysis, doubling the bi-directional image decoding speed causes an increase of the rate of exchange with the memory by 25% only, which still allows to use standard and cheap memory components.

Figure 1:
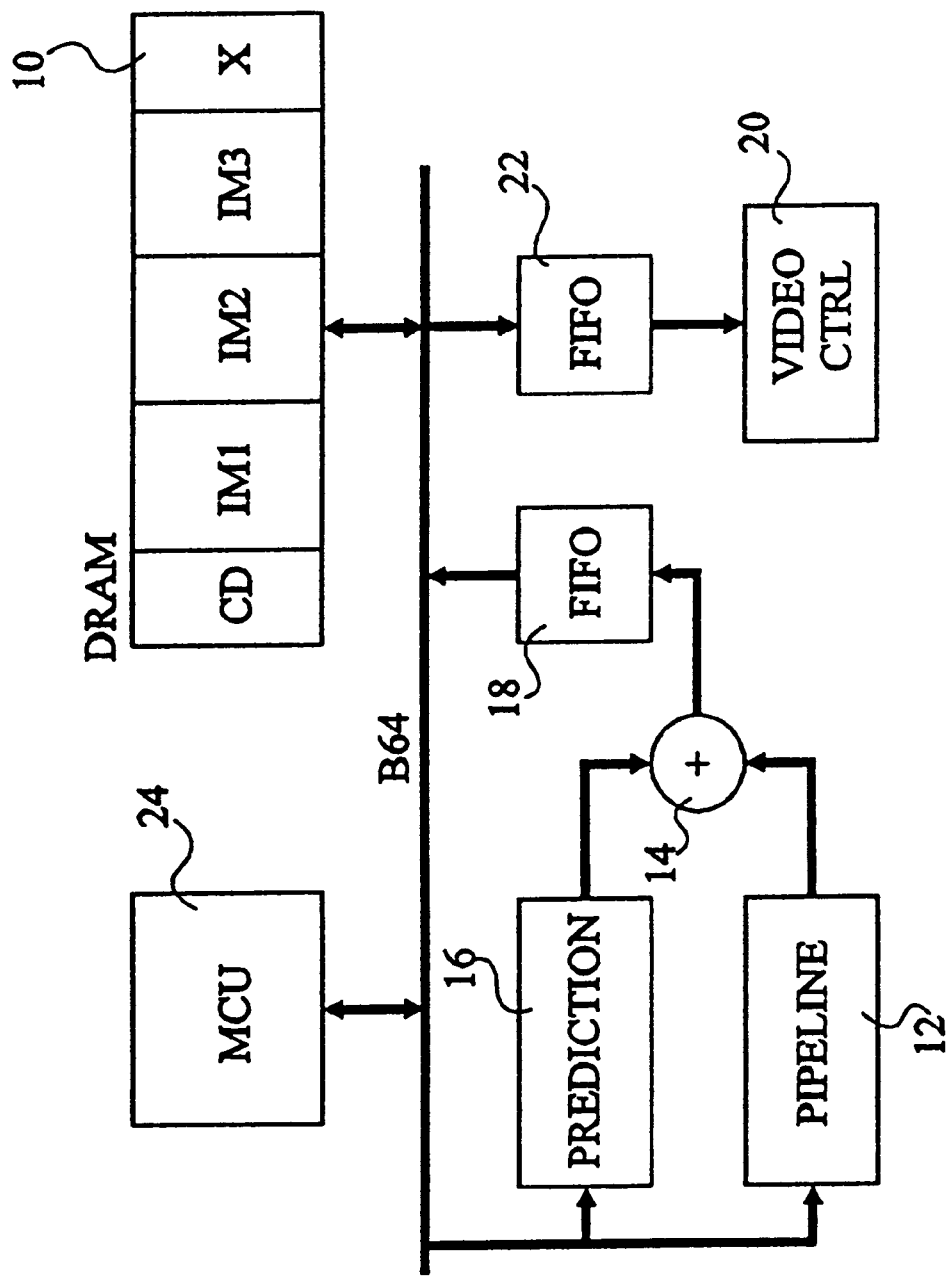
FIG. 1, previously described, schematically shows a conventional MPEG decoder.

The following analysis is based, as an example, on the decoder described in European patent application 0626653 (FIG. 1). The data is exchanged with memory 10 over a 64 bit bus.

During the display time of an image, the conventional decoder of FIG. 1 must perform several concurrent operations. These operations are indicated in the following table. This table further indicates the corresponding cost in memory access cycles of the different operations.

The cost in cycles is calculated over the display time of an image which may have, in a compressed form, a maximum size of 1.75 Mbits specified by the MPEG standards. The worst case situation is that of a 1.75 Mbit NTSC image, since NTSC images, smaller (720×480 pixels) than those of the other standards, are displayed in a shorter time. This display time is 33.37 milliseconds.

| Operation | Cost in cycles |
| --- | --- |
| Interlaced MB Prediction | 253,800 |
| Compressed Data Read | 2x 28,672 |
| Current Image Storing | 64,800 |
| Current Image Display | 86,400 |
| On Screen Display | 10,800 |
| Compressed Data Write | 7,820 |
| Refresh | 6,400 |
| Total increased by 34% | 653,068 |
| Time 33.37 ms | |
| Frequency 19.6 MHz | |

The most expensive operation is the supply of predictor macroblocks to predictor circuit 16 when, in the worst case, each of the macroblocks of the image to process is of interlaced bi-directional type. In this specific case, four half predictor macroblocks are supplied to predictor circuit 16 for each processed macroblock. Two half predictor macroblocks, fetched in a previously decoded image, respectively correspond to odd and even lines.

A complete predictor macroblock comprises a luminance array of 17×17 pixels of 8 bits and a chrominance array of 9×18 pixels of 8 bits, that is, the luminance and chrominance arrays of a predictor macroblock respectively comprise one more column and one more row of pixels and one more column and two more rows of pixels than the corresponding arrays of a normal macroblock. This is needed for the half-pixel filtering in predictor circuit 16.

In addition, the first pixel of a predictor macroblock can coincide with any pixel of a macroblock of a previously decoded image. This means that this first pixel of the predictor macroblock is not at the beginning of a 64-bit word stored in memory 10. Actually, each row of the luminance array of the predictor macroblock extends over three 64-bit words, and each row of the chrominance array of the predictor macroblock extends over two 64-bit words. Thus, the access to a predictor macroblock involves the access to a 17-pixel high and 24-pixel wide block (corresponding to three 64-bit words) to recover the 17×17 pixel luminance array, and the access to an 18-pixel high and 16-pixel wide block (corresponding to two 64 bit-words) to recover the 9×18 pixel chrominance array. In summary, fetching a predictor macroblock requires the access to 87 words of 64 bits, which represents a cost of 87 cycles.

In the case where two half predictor macroblocks must be fetched separately, each corresponding half luminance array is 9 pixels high (the effective 8-row array plus a further row for the half-pixel filtering). Besides, each half chrominance array is 10 pixels high. Indeed, the half chrominance array comprises, for each of two components (U and V), four effective rows plus one further row for the half-pixel filtering. The resulting cost for fetching two half predictor macroblocks is 94 cycles. The cost indicated in the above table corresponds to number 94 multiplied by 2 (bi-directional processing) and by 1350 (the number of macroblocks to process in the image).

Another operation consists in reading the compressed data of the currently decoded image. As previously mentioned, in the worst case, the amount of compressed data corresponding to an image is 1.75 Mbits which are read in 28,672 cycles. Additionally, the compressed data of the following image must be read to find a new header, which corresponds to 28,672 further cycles in the worst case.

The storage of the decoded image (1350 macroblocks) costs 68,400 cycles, and its reading back for display it costs 86,400 cycles (more cycles are required for the display than for the storage, since the chrominance data is read back twice for display).

While an image is being displayed, there can also be OSD information to display. This OSD information is constituted by two-bit pixels. To display the OSD information corresponding to the image, 10,800 cycles are needed.

As an image is being displayed, the continuous reception of compressed data must be provided for. This compressed data arrives with a maximum rate of $15 \times 10^6$ bits/s and must be written into memory 10. The corresponding number of access cycles is 7,820.

Finally, memory 10 must be refreshed every 8 milliseconds. The memory is refreshed page by page in three cycles per page. A 256 k×16 component includes 512 pages, and 6,400 refresh cycles are required in 33.37 ms.

The total number of cycles of the table is increased by approximately 34% to account for necessary page access cycles. The reading of the half predictor macroblocks and the display, which is performed line by line whereas the images are stored by macroblocks, require particularly high amounts of page accesses. As a result, in the known decoder of FIG. 1, 653,068 cycles must be performed in 33.37 ms, which corresponds to an operating rate of 19.6 megahertz or to an access time of 51 nanoseconds. Standard memories than can operate at this speed are memories of the "−80" type.

According to the invention, for a display of bi-directional images on the run, the cost in cycles must be computed over the display time of a row of macroblocks, and not of an image. Indeed, the MPEG standards indicate that, for each image, the number of bits corresponding to a row of compressed macroblocks can reach a maximum value equal to the number of bits of a non-compressed row plus one macroblock. This situation must be processed in real time. This is more constraining than the conventional worst case of a compressed image with a maximum size of 1.75 Mbits. A bi-directional image is conventionally displayed with a delay, which allows absorption of local processing delays, for example due to a worst case macroblock row.

The minimum value of the display time of a macroblock row is 1.02 milliseconds for the NTSC standard. Thus, to process each NTSC image twice, a decoder according to the invention must be able to process in 0.51 millisecond a row of worst case macroblocks, that is, 45 macroblocks corresponding to an image width of 720 pixels. The following table shows the operations to perform according to the invention, as well as the cost in access cycles.

| Operation | Cost in cycles |
|---|---|

| -continued | |
|---|---|
| Progressive MB Prediction | 7,830 |
| Compressed Data Read | 2,208 |
| OSD | 270 |
| Compressed Data Write | 150 |
| Refresh | 107 |
| Total increased by 23% | 12,995 |
| Time 0.51 ms | |
| Frequency 25.5 MHz | |

In this table, the storage and display cycles of the currently decoded image have disappeared. Indeed, the decoded pixels are displayed immediately; they no longer need to transit through memory 10 any more.

The worst prediction case is not that of the interlaced bi-directional macroblocks but that of the progressive bi-directional macroblocks (i.e. with complete predictor macroblocks), which now only costs 87 cycles per macroblock or 7,830 cycles for a row. Indeed, during the first decoding pass, only the first field is displayed, which corresponds to the odd lines; the restoring of an interlaced macroblock does not require here the use of the half macroblocks corresponding to even lines. Similarly, during the second decoding pass, only the second field is displayed, which corresponds to the even lines; the restoring of an interlaced macroblock does not require here the use of the half macroblocks corresponding to the odd lines. Hence, the reading of two half macroblocks is saved in an interlaced prediction.

The compressed data to be read corresponds to the number of bits of 46 (45+1) non compressed macroblocks. 2,208 cycles are needed for this purpose.

The costs of OSD, of compressed data writing, and of refreshing, brought to 0.51 ms, are half those of the previous table, since the costs of these operations are proportional to time, which is here half the normal decoding time.

The search for an image header does not appear in the table, since it can be performed outside the display periods, for example during frame retraces which leave sufficient time for this, even in the worst case situations.

The total cost of this double speed decoding is increased by 23% to account for necessary page accesses. The 23% margin is lower than the margin of the conventional situation (34%), because the memory accesses performed are more regular, especially for fetching two complete predictor macroblocks instead of four half predictor macroblocks, which reduces the amount of page accesses. The resulting cost is 12,995 cycles, which corresponds, over 0.51 ms, to an operating frequency of 25.5 MHz, or to an access time of 39 nanoseconds. Standard memories which can operate at such a speed are memories of the "−60" type, which are slightly more expensive, and sometimes just as expensive, as "−80" type memories.

Of course, the operating speeds of the processing circuits must be adapted to the double decoding of the bi-directional images. For this purpose, memory control unit 24 just has to be rated at 25.5 MHz. Pipeline circuit 12, which processes one pixel per cycle, must be rated at 34 megahertz, which corresponds to the 17,280 pixels which must be processed during 0.51 millisecond. Circuits operating at these speeds are easily implementable in the usual technologies. In fact, it is essentially memory 10 that limits the operating speed.

Figure 2:
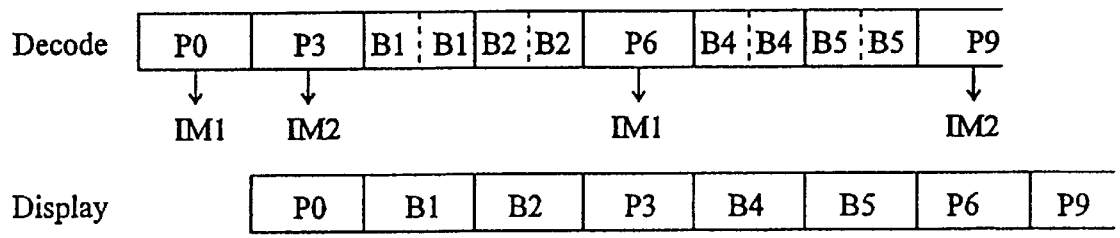
FIG. 2 shows a sequence of decoding and display of several images according to the present invention.

FIG. 2 shows a timing diagram of the decoding and the display of a series of images according to the present invention. Images to be successively displayed are referred to as P0, B1, B2, P3, B4, B5, P6, where the letter P indicates a predicted image and the letter B indicates a bi-directional image. Such an image succession is conventional according to the MPEG standards.

The restoring of each predicted image P requires predictor macroblocks fetched in the predicted image (or intra, not shown) which comes before it. The restoring of each bi-directional image B requires predictor macroblocks fetched in the predicted images which surround it. Thus, the compressed data corresponding to the images arrive to the decoder in an order different from the display order. Here, the compressed data arrive in the order P0, P3, B1, B2, P6, B4, B5.

Initially, image P0 is decoded and stored in memory, for example in an area IM1. While image P3 is being decoded and stored in an area IM2, image P0 is displayed. Then, image B1 is decoded a first time at double speed while the first field of image B1 is displayed on the run, then image B1 is decoded a second time at double speed while the second field of image B1 is displayed. Each decoding of image B1 uses predictor macroblocks fetched in images P0 and P3, which are stored in areas IM1 and IM2. The same operations take place for bi-directional image B2. Then, image P6 is decoded and stored in area IM1 in the place of image P0, while image P3 is displayed. Images B4 and B5 are, as images B1 and B2, decoded twice at double speed while they are displayed. The decoding processes of images B4 and B5 use predictor macroblocks fetched in images P3 and P6 which are stored in areas IM1 and IM2, etc.

Figure 3:
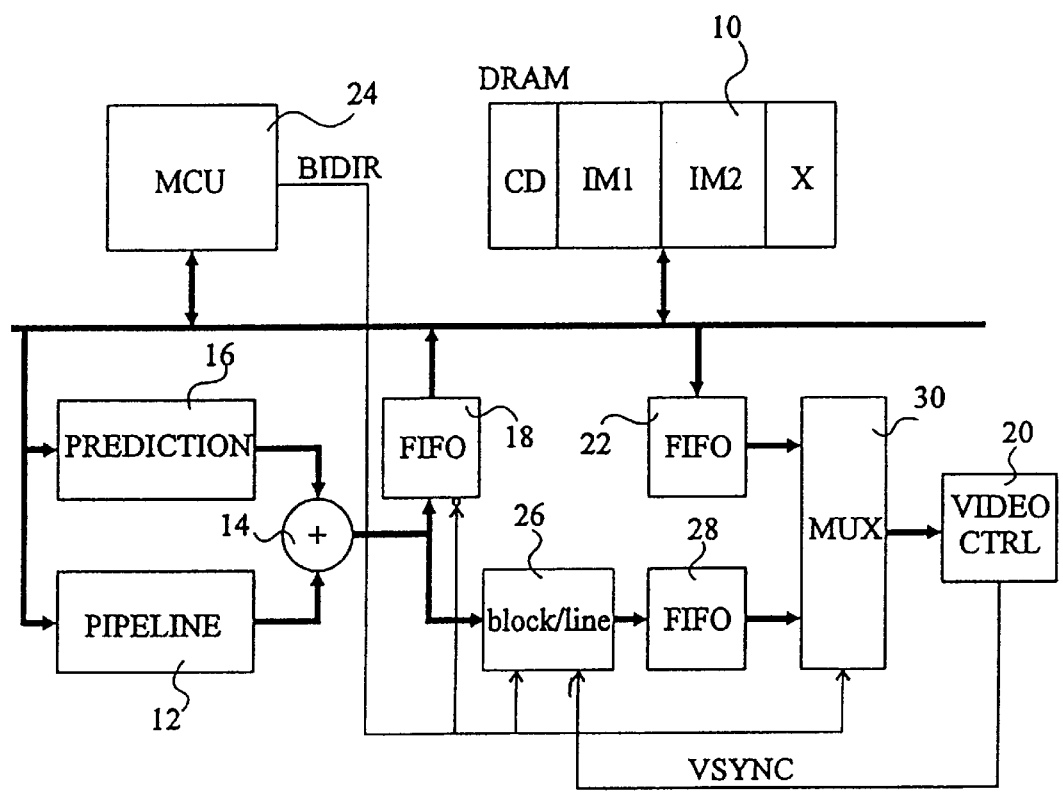
FIG. 3 shows an example of a modification of the decoder of FIG. 1 to implement the present invention.

FIG. 3 shows an example of a modification of the decoder of FIG. 1 to implement the double decoding of bi-directional images according to the invention. Elements common with FIG. 1 are designated by the same references. Memory 10 no longer contains the third image area IM3. The output of adder 14, connected to buffer memory 18, is further connected to a block scan to line scan converter 26. Indeed, adder 14 provides 8×8 pixel blocks corresponding to each of the 8×8 pixel blocks of the processed macroblocks, while display circuit 20 must receive the pixels line by line. The capacity of this scan converter 26 is of eight lines, even though the macroblocks correspond to 16 lines. Indeed, for each decoding, only one field is displayed, that is, only the even lines or only the odd lines. Thus, scan converter 26 sorts, among the lines of the blocks it receives, those with a parity corresponding to that of the field to display. This parity selection is for example determined by a field synchronization signal VSYNC supplied by display circuit 20. Scan converter 26 may be of the type disclosed in U.S. Pat. No. 5,151,976 which is incorporated herein by reference in order to limit its size.

The output of converter 26 is supplied to a buffer 28. A multiplexer supplies display circuit 20 with either one of the outputs of buffer 28 and of buffer 22 which receives from memory 10 non-bi-directional images to display. A selection signal BIDIR switches multiplexer 30 and enables either one of scan converter 26 or buffer 18 according to whether adder 14 supplies or not a bi-directional image. This signal BIDIR is activated, for example, by memory control unit 24 when it initiates the transfer of the compressed data of a bi-directional image to pipeline circuit 12.

Memory control unit 24 is reprogrammed to perform the task of transferring twice to pipeline circuit 12 the compressed data corresponding to each bi-directional image.

A worst case macroblock row has a very low probability of occurring. Thus, it is most of the time not necessary to achieve memory accesses at as high a speed as 25.5 MHz, requiring "–60" memories. According to an embodiment, the speed of the memory accesses is adapted to the processing of a worst case image instead of a worst case macroblock row, which reduces the speed of the memory accesses to 22.8 MHz in the above-mentioned examples. "–70" memories can then be used.

However, in order to process a very unlikely worst case macroblock row, this embodiment detects the decoding delay which would then occur and forces the decoder to use only one of the two predictor macroblocks. Of course, a slight alteration of the decoded pixels would result therefrom, but this alteration would not be perceptible, since it would happen at most throughout the macroblock row display time (1.02 ms).

The decoding delay is detected, for instance, by detecting that the number of decoded macroblocks becomes lower than the number of displayed macroblocks. These two numbers are conventionally available in the decoder.

Having thus described at least one illustrative embodiment of the invention, various alterations, modifications and improvements will readily occur to those skilled in the art. Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. An image decoder to receive a plurality of images and provide a plurality of decoded images, the plurality of images including progressive bi-directional type images which require data from at least two previously decoded images of the plurality of decoded images, the decoder comprising:

a memory that stores the at least two previously decoded images;

a processing circuit that decodes each image of the plurality of images to provide the plurality of decoded images; and a display to receive each decoded image of the plurality of decoded images in two successive fields corresponding to lines of first and second parities, respectively;

wherein the processing circuit decodes each respective progressive bi-directional type image twice completely during a display time of a respective decoded image corresponding to the respective progressive bi-directional type image, a first time while it directly supplies the display with a first field of the respective decoded image, and a second time while it directly supplies the display with the second field of the respective decoded image.

2. A decoder according to claim 1, wherein the processing circuit decodes each image of the plurality of images by blocks gathered in macroblocks corresponding to image squares, the processing circuit including a reorganization circuit for receiving the fields of the respective decoded by half blocks corresponding to lines of same parity, and supplying the corresponding lines of same parity to the display.

3. A decoder according to claim 1, wherein each image of the plurality of images includes at least one macroblock and a bi-directional macroblock of the respective progressive bi-directional type image is of an interlaced type requiring two half predictor macroblocks in each of the at least two previously decoded images, wherein the two half predictor macroblocks of a same previously decode image of the at least two previously decoded images correspond to lines with different parities, and wherein, for decoding the interlaced bi-directional macroblock of the respective progressive bi-directional type image, the processing circuit uses, in each of the two decoding passes, only the two half predictor macroblocks of the at least two previously decoded images corresponding to lines of a same parity as the field of the respective decoded image supplied to the display.

4. A method for decoding an image that can be of a progressive bi-directional type requiring data from two previously decoded images, each image being displayed in two successive fields corresponding to lines with different parities, the method comprising the steps of decoding each respective progressive bi-directional image twice completely during a display time of the respective progressive bi-directional image, a first time while a first field of the respective progressive bi-directional image is directly displayed, and a second time while the second field of the respective progressive bi-directional image is directly displayed.

5. A decoding method according to claim 4, wherein each image is decoded by macroblocks corresponding to image squares, wherein a bi-directional macroblock of the respective progressive bi-directional image can be of an interlaced type requiring two half predictor macroblocks in each of the two previously decoded images, the two half predictor macroblocks of a same previously decoded image of the two previously decoded images corresponding to lines with different parities, and wherein, for decoding an interlaced bi-directional macroblock of the respective progressive bi-directional image, only the two half predictor macroblocks of the two previously decoded images corresponding to lines of a same parity as the displayed field are used in each of the two decoding passes.

6. A decoding method according to claim 5, the method further comprising steps of detecting that a number of decoded macroblocks becomes lower than a number of displayed macroblocks, and using only one of the two half predictor macroblocks of the two previously decoded images in decoding the interlaced bi-directional macroblock of the respective progressive bi-directional image.

* * * * *